United States Patent [19]

Yukuta et al.

[11] 4,234,695

[45] Nov. 18, 1980

[54] METHOD OF PRODUCING POLYUREA FOAMS

[75] Inventors: Toshio Yukuta; Takumi Ishiwaka, both of Yokohama; Kiyoshi Usui, Kawasaki, all of Japan

[73] Assignee: Bridgestone Tire Co., Ltd., Tokyo, Japan

[21] Appl. No.: 88,312

[22] Filed: Oct. 25, 1979

[30] Foreign Application Priority Data

Oct. 25, 1978 [JP] Japan .................................. 53-131128
Oct. 25, 1978 [JP] Japan .................................. 53-131129

[51] Int. Cl.$^3$ .............................................. C08J 9/02
[52] U.S. Cl. .................................... 521/107; 521/110; 521/112; 521/128; 521/163
[58] Field of Search ................ 521/163, 110, 112, 128

[56] References Cited

U.S. PATENT DOCUMENTS

| | | | |
|---|---|---|---|
| 3,143,517 | 8/1964 | Heiss | 521/121 |
| 3,563,957 | 2/1971 | Beebe | 528/52 |
| 3,717,597 | 2/1973 | Hesskamp et al. | 521/54 |

*Primary Examiner*—Morton Foelak
*Attorney, Agent, or Firm*—Sughrue, Rothwell, Mion, Zinn and Macpeak

[57] ABSTRACT

A method of producing polyurea foams is disclosed. The polyurea foam is produced by reacting an organic polyisocyanate with water in the presence of urea or by reacting a crude tolylene diisocyanate or a mixture of crude tolylene diisocyanate and crude diphenylmethane diisocyanate as an organic polyisocyanate with water in the presence of an amine catalyst, a silicone surfactant and, if necessary, a tin catalyst.

10 Claims, No Drawings

METHOD OF PRODUCING POLYUREA FOAMS

The present invention relates to an improvement in a method of producing polyurea foams.

As a method of producing polyurea foams having urea linkages therein by the reaction of an organic polyisocyanate with water, there have hitherto been proposed (1) the use of imidazole as a catalyst (Japanese Patent laid open No. 4,565/77), (2) the reaction of diphenylmethane diisocyanate as an organic polyisocyanate with water in the presence of an amine catalyst and a blowing agent (Japanese Patent laid open No. 98,796/77), and (3) the reaction of a urethane prepolymer, which is obtained by the reaction of a polyether polyol with a polyisocyanate, as an organic polyisocyanate with water and a urea (Japanese Patent Application Publication No. 30,556/77 and No. 30,557/77).

In the method (1), however, expensive imidazole must be used as the catalyst. Furthermore, when using an amine catalyst or a tin catalyst instead of imidazole, cell collapse is caused. In the method (2), diphenylmethane diisocyanate (hereinafter abbreviated as MDI) is only used as the organic polyisocyanate, so that the foaming stability is poor as mentioned below (see Comparative Example 1) and hence the resulting foam collapses during the foaming or shrinks after the foaming. In the method (3), the urethane prepolymer to be used as the organic polyisocyanate must be previously produced by the reaction of the specific polyether polyol with the polyisocyanate, so that the production process becomes complicated and the production cost increases. Further, the resulting foam becomes more flexible due to the use of high molecular weight polyether polyol.

The inventors have made various studies in order to solve the above mentioned drawbacks of the prior arts and as a result, the present invention has been accomplished.

According to a first aspect of the present invention, there is provided a method of producing polyurea foams, which comprises reacting an organic polyisocyanate with water in the presence of urea.

The inventors have made further studies with respect to the polyurea foam produced by the reaction of the organic polyisocyanate with water and as a result, it has been found that polyurea foams having an improved foaming stability can be produced by using a particular organic polyisocyanate without the addition of urea.

According to a second aspect of the present invention, there is provided a method of producing polyurea foams, which comprises using a crude tolylene diisocyanate or a mixture of crude tolylene diisocyanate and crude diphenylmethane diisocyanate as an organic polyisocyanate and reacting it with water in the presence of an amine catalyst, a silicone surfactant and, if necessary, a tin catalyst.

The present invention will be described below in greater detail.

According to the first aspect of the present invention, urea is added when the organic polyisocyanate is reacted with water, whereby polyurea foams having an improved foaming stability can be produced without causing the foam collapse during the foaming or the foam shrinkage after the foaming. Therefore, the urea is an essential component for improving the foam stability of the polyurea foam.

The amount of urea added is not critical, but it is preferable within a solubility limit in water to be reacted with the organic polyisocyanate. The solubility of urea in water is about 51.6 g per 100 g of water at 20° C.

Since the water and urea are active hydrogen compounds, they are used in an amount of 0.20–10 equivalent to the organic polyisocyanate (a range of 500–10 as converted into an isocyanate index), preferably 1–5 equivalent (a range of 100–20 as converted into an isocyanate index). (In this case, 1 mole of urea is estimated as 2 equivalent.)

Although the reason why the addition of urea can produce polyurea foams having an improved foaming stability is not clear, it is suggested that the reactivity of the organic polyisocyanate to urea is later than the reactivity to water and takes part in the cross-linking reaction during the later half of the foaming.

In order to make the foam density low, the value of the isocyanate index is decreased, i.e. the amount of the active hydrogen compound (urea and water) is increased, but when the amount of the active hydrogen compound used exceeds the upper limit of the above defined range, the foam collapses during the foaming or the resulting foam becomes very friable. On the other hand, when the value of the isocyanate index exceeds the upper limit of the above defined range or the amount of the active hydrogen compound used is less than the lower limit, the scorching is apt to be caused during the foaming and cavities may be formed in central part of the resulting foam due to the scorching. Therefore, the reaction ratio of the organic polyisocyanate to the active hydrogen compound (water and urea) should be within the above defined range.

According to the first aspect of the present invention, polyurea foams can stably be produced only by reacting the organic polyisocyanate with water in the presence of urea, but when further adding an amine catalyst, a silicone surfactant and a tin catalyst, which have usually been used in the production of polyurethane foams, the foams may be produced more stably. In the latter case, it is preferable to use a cyclohexyl amine compound having the following formula

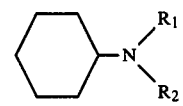

wherein $R_1$ is an alkyl group having a carbon number of 1–12 and $R_2$ is an alkyl group having a carbon number of 1–12 or a cycloalkyl group having a carbon number of 4–6, an example of which including N,N-dimethylcycloalkyl amine, N-methyldicyclohexyl amine, N,N-diethylcyclohexyl amine and the like, as a component of the amine catalyst in view of the production of cell-ordered foams.

As the organic polyisocyanate, use may be made of any ones commonly used in the production of polyurethane foams, a typical example of which includes tolylene diisocyanate, crude tolylene diisocyanate, phenylene diisocyanate, diphenylmethane diisocyanate, crude diphenylmethane diisocyanate, 1,6-hexamethylene diisocyanate, isophorone diisocyanate and the like. These compounds may be used alone or in admixture of two or more compouns.

Among them, the use of crude diphenylmethane diisocyanate, crude tolylene diisocyanate or a mixture thereof is preferable in view of economic reason, easy production and the like.

The term "crude tolylene diisocyanate" means a crude product having an isocyanate content of 30-40% by weight. The term "crude diphenylmethane diisocyanate" means a crude product having an isocyanate content of 25-35% by weight and includes polymethylene polyphenyl isocyanate.

When using the crude tolylene diisocyanate as the organic polyisocyanate, there can be produced an oepn-cell foam having an improved foaming stability. On the other hand, when using the crude diphenylmethane diisocyanate as the organic polyisocyanate, there can be produced a closed-cell foam having an improved foaming stability.

According to the second aspect of the present invention, only the crude tolylene diisocyanate or a mixture of the crude tolylene diisocyanate and the crude diphenylmethane diisocyanate is used as the organic polyisocyanate. When using the organic polyisocyanate other than the above defined substance, the foam cannot be produced stably as mentioned below (see Comparative Examples 3 and 5). For instance, when using a pure tolylene diisocyanate, the resulting foam collapses during the foaming, while when using crude diphenylmethane diisocyanate alone, the resulting foam collapses or shrinks, so that both the cases cannot stably produce the polyrea foams.

In the second aspect of the present invention, water to be reacted with the organic polyisocyanate is used in an amount of 0.20-10 equivalent to the organic polyisocyanate (a range of 500-10 as converted into an isocyanate index), preferably 1-5 equivalent (a range of 100-20 as converted into an isocyanate index). In order to make the foam density low, the value of the isocanate index is decreased, i.e. the amount of water used is increased, but when the amount of water used exceeds the upper limit, the foam collapses during the foaming or the resulting foam becomes very friable. On the other hand, when the value of the isocyanate index exceeds the upper limit or the amount of water used is less than the lower limit, the scorching is apt to be caused during the foaming and cavities may be formed in central part of the foam due to the scorching. Therefore, the reaction ratio of the organic polyisocyanate to water should be within the above defined range.

In addition to the above reactants, there are used an amine catalyst commonly used in the production of polyurethane foams, a silicone surfactant and, if necessary, a tin catalyst. In this case, the polyurea foams can stably be produced when a cyclohexyl amine compound having the following formula

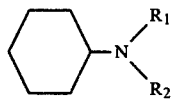

wherein $R_1$ is an alkyl group having a carbon number of 1-12 and $R_2$ is an alkyl group having a carbon number of 1-12 or a cycloalkyl group having a carbon number of 4-6, an example of which including N,N-dimethylcyclohexyl amine, N-methyldicyclcohexyl amine, N,N-diethylcyclohexyl amine and the like, is used as a component of the amine catalyst. That is, the addition effect of the cyclohexyl amine compound is proved from the fact that even when the crude tolylene diisocyanate is used as the organic polyisocyanate, if the cyclohexyl amine compound is not used as the amine catalyst, the cells of the resulting foam become coarser (see Comparative Example 4).

In the first and second aspects of the present invention, when the crude tolylene diisocyanate is used alone as the organic polyisocyanate, the friability of the resulting foam may become large. This can be improved by using a mixture of the crude tolylene diisocyanate and the crude diphenylmethane diisocyanate. In the latter case, the mixing ratio of the crude tolylene diisocyanate to the crude diphenylmethane diisocyanate is optional, but it is preferable within a range of 1:1-7:3 (weight ratio).

The polyurea foams obtained by the method of the present invention are rigid, but the friability of the foam can be further improved by the addition of a plasticizer. As the plasticizer, use may be made of any ones containing no active hydrogen to be reacted with the organic polyisocyanate, which are commonly used in the ordinary plastic field. Preferably, there are used phosphorus/halogen series flame retardants achieving not only the improvement of the friability but also the flameproofing of the foam. In view of economic reasons and easy use, tris(halogenated alkyl)-phosphates are preferably used as the plasticizer, a typical example of which includes tris(2-chloroethyl)phosphate, tris(-chloropropyl)phosphate, tris(2,3-dichloropropyl)phosphate, tris(2,3-dibromopropyl)phosphate and the like.

The amount of the plasticizer added is not particularly restricted, but it is preferably 10-200 parts by weight per 100 parts by weight of the organic polyisocyanate. Particularly, the plasticizer is added in an amount of 50-100 parts by weight when the crude tolylene diisocyanate is used alone as the organic polyisocyanate or in an amount of 10-50 parts by weight when the crude diphenylmethane diisocyanate is used along or in admixture with the crude tolylene diisocyanate as the organic polyisocyanate.

According to the present invention, rigid polyurea foams can stably be produced from the above mentioned ingredients by any well-known one-shot processes, so that the step of producing the urethane prepolymer can be omitted. Further, the production cost of the foam can be reduced owing to the use of inexpensive urea. Particularly, the method of producing polyurea foams from tolylene diisocyanate is not known up to now, but is first successed by the present invention.

The polyurea foams according to the present invention have various densities ranging from low density to high density in compliance with the compounding conditions and are usable in the applications for conventional rigid polyurethane foams. For instance, the polyurea foams according to the present invention can be used for the manufacture of various thermal insulating materials, sound absorption materials, packing materials, agricultural materials, panel fillers and the like.

The following examples are given in illustration of the present invetion with comparative examples and are not intended as limitations thereof. In the examples, all parts are by weight, unless otherwise stated.

EXAMPLES 1-13, COMPARATIVE EXAMPLES 1-2

Polyurea foams were produced at a two times scale of a compounding recipe shown in the following Table 1 according to the first aspect of the present invention.

That is, 200 g of the isocyanate ingredient was weighed in a paper cup of 1 l capacity, to which were added predetermined amounts of the silicone surfactant, catalyst and the like. Then, a predetermined amount of a 45% aqueous solution of urea, which was separately prepared, was poured into the paper cup and vigorously agitated with a propeller stirrer for about 3–10 seconds. The resulting mixed solution was cast into a paper cup of about 30 cm square and foamed to produce a polyurea foam.

comes faster and the satisfactory polyurea foam can be obtained productively.

EXAMPLES 14–21, COMPARATIVE EXAMPLES 3–5

Polyurea foams were produced at a two times scale of a compound recipe shown in the following Table 2 in

TABLE 1

|  |  | Example |  |  |  |  |  |  |  |  |  |  |  |  | Comparative Example |  |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 |
| Isocyanate ingredient | TRC-50X[1] | 100 | 100 | 100 | 60 | 60 | 60 | 60 | 60 | 60 | 40 |  |  | 100 |  | 100 |
|  | Mirionate MR[2] |  |  |  | 40 | 40 | 40 | 40 | 40 | 40 | 60 | 100 | 100 |  | 100 |  |
| Urea Solution[3] |  | 30.8 | 10.3 | 7.7 | 29.2 | 14.6 | 14.6 | 14.6 | 9.7 | 7.3 | 17.0 | 16.0 | 9.6 | 10.3 |  |  |
| Water |  |  |  |  |  |  |  |  |  |  |  |  |  |  | 6.2 | 6.2 |
| Catalyst | Cyclohexyl amine compound[4] | 1.0 | 1.0 | 1.0 | 1.0 | 1.0 | 1.0 | 1.0 | 1.0 | 1.0 | 2.0 | 2.0 | 2.0 |  | 1.0 |  |
|  | N-ethylmorpholine | 1.0 | 1.0 | 1.0 | 1.0 | 1.0 | 1.0 | 1.0 | 1.0 | 1.0 |  |  |  |  | 1.0 |  |
| Silicone surfactant | SH-193[5] |  | 2.0 | 2.0 | 2.0 | 2.0 | 2.0 | 2.0 | 2.0 | 1.0 |  |  |  |  | 2.0 |  |
|  | L-544[6] | 2.0 |  |  |  |  |  |  |  |  | 2.0 | 2.0 | 2.0 |  |  |  |
| Plasticizer | TCPP[7] | 50.0 | 50.0 | 50.0 |  |  | 25.0 | 35.0 |  |  |  |  |  |  |  |  |
| Isocyanate index[8] |  | 35 | 106 | 142 | 36 | 71 | 71 | 71 | 107 | 143 | 60 | 60 | 100 | 106 | 106 | 106 |
| Rise time | (sec.) | 71 | 62 | 53 | 78 | 61 | 53 | 51 | 50 | 46 | 19 | 22 | 17 | 600 | Foam collapsed or shrunk | Not foamed |
| Foam density | (kg/cm³) | 8.5 | 8.9 | 19.9 | 6.2 | 6.4 | 7.9 | 9.5 | 7.4 | 9.7 | 6.8 | 7.1 | 7.9 | 10 |  |  |

Note:
[1]Crude tolylene diisocyanate, made by Mitsui Toatsu Co., Ltd., NCO 35 wt. %
[2]Crude diphenylmethane diisocyanate, made by Nippon Polyurethane Co., Ltd., NCO 30.7 wt. %
[3]45% aqueous solution of urea
[4]Mixture of N,N-dimethylcyclohexyl amine/N-methyldicyclohexyl amine = 3/1 (weight ratio)
[5]Made by Toray Silicone Co., Ltd.
[6]Made by Nippon Unicar Co., Ltd.
[7]Tris(chloropropyl)phosphate
[8]A ratio of isocyanate equivalent of the organic polyisocyanate to hydroxyl equivalent of active hydrogen compound × 100

As apparent from the data of Table 1, all of Examples 1–13 produced polyurea foams having an improved foaming stability and a microcell structure, respectively.

In Comparative Example 1 using no urea, the foam collapsed during the foaming or shrunk after the foaming, while in Comparative Example 2 showing only the reaction of the isocyanate ingredient with water, there was caused no foaming.

As can be seen from Example 13, when the isocyanate ingredient is reacted with water in the presence of only urea, polyurea foam can be obtained satisfactorily. Moreover, when the amine catalyst is added to the reaction system of Example 13, the reaction rate becomes faster and the satisfactory polyurea foam can be obtained productively.

the same manner as described in Example 1 according to the second aspect of the present invention.

TABLE 2

|  |  | Example |  |  |  |  |  |  |  | Comparative Example |  |  |
|---|---|---|---|---|---|---|---|---|---|---|---|---|
|  |  | 14 | 15 | 16 | 17 | 18 | 19 | 20 | 21 | 3 | 4 | 5 |
| Isocyanate ingredient | TRC-50X[1] | 100 | 100 | 100 | 100 | 100 | 100 | 60 | 60 | T-80[9] | TRC-50X | Mirionate MR |
|  | Mirionate MR[2] |  |  |  |  |  |  | 40 | 40 | 100 | 100 | 100 |
| Water |  | 15.0 | 15.0 | 7.5 | 5.0 | 3.8 | 3.8 | 14.2 | 7.1 | 7.5 | 7.5 | 6.6 |
| Catalyst | Cyclohexyl amine compound[4] | 1.0 | 1.0 | 1.0 | 1.0 | 1.0 | 1.0 | 1.0 | 1.0 | 1.0 | Triethylene-diamine 1.0 | Cyclohexyl-amine compound 1.0 |
|  | N-ethylmorpholine | 1.0 | 1.0 | 1.0 | 1.0 | 1.0 | 1.0 | 1.0 | 1.0 | 1.0 | 1.0 | 1.0 |
| Silicone surfactant | SH-193[5] | 1.0 |  | 1.0 | 2.0 | 1.0 | 2.0 | 1.0 | 1.0 | 1.0 | 1.0 | 1.0 |
|  | L-544[6] |  | 2.0 |  |  |  |  |  |  |  |  |  |
| Plasticizer | TCPP[7] |  | 50.0 |  | 50.0 |  | 50.0 |  |  |  |  |  |
| Isocyanate index[8] |  | 50 | 50 | 100 | 150 | 200 | 200 | 50 | 100 | 100 | 100 | 100 |
| Rise time | (sec.) | 59 | 64 | 45 | 48 | 43 | 41 | 45 | 34 | Foam collapsed | Foam cell became coarser | Foam collapsed or shrunk |
| Foam density | (kg/cm³) | 4.6 | 6.6 | 5.6 | 19.7 | 12.0 | 25.9 | 5.2 | 5.9 |  |  |  |

Note:
[9]Mixture of 80 parts by weight of 2,4-tolylene diisocyanate and 20 parts by weight of 2,6-tolylene diisocyanate, made by Nippon Polyurethane Co., Ltd., NCO 48.3 wt. %.

foaming stability and a microcell structure, respectively.

As apparent from the data of Table 2, all of Examples 14–21 produced polyurea foams having an improved foaming stability and a microcell structure, respectively.

In Comparative Example 3 using a pure tolylene diisocyanate as the isocyanate ingredient, the foam could not stably be produced due to the fact that the foam collapses during the foaming. In Comparative Example 4 using triethylenediamine as the amine catalyst instead of the cyclohexyl amine compound, the foam also collapsed during the foaming. In Comparative Example 5 using the crude diphenylmethane diisocyanate as the isocyanate ingredient, the foam collapsed during the foaming or shrunk after the foaming.

As can be seen from Examples 14–21, polyurea foams having an improved foaming stability can be produced by reacting the crude tolylene diisocyanate or the mixture of crude tolylene diisocyanate and crude diphenylmethane diisocyanate with water in the presence of the amine catalyst and other additives. In this case, a better result can be obtained when the cyclohexyl amine compound is used as a component of the amine catalyst.

In the production of conventional polyurethane foams, it is necessary to use expensive polyol, isocyanate, catalyst, blowing agent and the like, while the present invention can stably produce the polyurea foam only by using inexpensive crude tolylene diisocyanate and crude diphenylmethane diisocyanate, water, catalyst and surfactant, so that the present invention has various merits in economy and industry.

What is claimed is:

1. A method of producing polyurea foams, which comprises reacting an organic polyisocyanate with water in the presence of urea.
2. A method as claimed in claim 1, wherein said reaction is carried out in the presence of an amine catalyst, a silicone surfactant and, if necessary, a tin catalyst.
3. A method as claimed in claim 1, wherein said organic polyisocyanate is a crude tolylene diisocyanate and/or a crude diphenylmethane diisocyanate.
4. A method as claimed in claim 1, wherein the amount of said urea is within a solubility limit in said water to be used.
5. A method as claimed in claim 1, wherein the total amount of said water and urea is 0.20–10 equivalent to said organic polyisocyanate.
6. A method of producing polyurea foams, which comprises using a crude tolylene diisocyanate or a mixture of crude tolylene diisocyanate and crude diphenylmethane diisocyanate as an organic polyisocyanate and reaction said crude tolylene diisocyanate or said mixture of crude tolylene diisocyanate and diphenylmethane diisocyanate with water in the presence of an amine catalyst, a silicone surfactant and, if necessary, a tin catalyst.
7. A method as claimed in claim 6, wherein the amount of said water is 0.20–10 equivalent to said organic polyisocyanate.
8. A method as claimed in claim 6, wherein said amine catalyst is a cyclohexyl amine compound.
9. A method as claimed in claim 1 or 6, wherein said reaction is carried out in the presence of a plasticizer.
10. A method as claimed in claim 9, wherein said plasticizer is a tris(halogenated alkyl)phosphate.

* * * * *